(12) United States Patent
Sathe

(10) Patent No.: US 6,799,227 B2
(45) Date of Patent: Sep. 28, 2004

(54) DYNAMIC CONFIGURATION OF A TIME DIVISION MULTIPLEXING PORT AND ASSOCIATED DIRECT MEMORY ACCESS CONTROLLER

(75) Inventor: Prachi S. Sathe, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 10/337,080

(22) Filed: Jan. 6, 2003

(65) Prior Publication Data

US 2004/0133710 A1 Jul. 8, 2004

(51) Int. Cl.$^7$ .............................................. G06F 13/14
(52) U.S. Cl. ........................ 710/22; 710/36; 711/214; 711/221
(58) Field of Search .................... 710/22, 36; 711/214, 711/221

(56) References Cited

U.S. PATENT DOCUMENTS 6,065,070 A * 5/2000 Johnson ........................ 710/22
6,157,970 A * 12/2000 Gafken et al. ................. 710/27
6,240,084 B1 * 5/2001 Oran et al. ................. 370/352
6,412,029 B1 * 6/2002 Mecklai et al. ............... 710/22

* cited by examiner

Primary Examiner—A. Elamin
(74) Attorney, Agent, or Firm—Christopher P. Maiorana, P.C.

(57) ABSTRACT

An apparatus comprising a transmit data path, a receive data path, a first circuit and a second circuit. The first circuit may be configured to transfer data between a first interface and the transmit and receive data paths. The second circuit may be configured (i) to transfer the data between the transmit and receive data paths and a second interface and (ii) to control a configuration update of the first and second circuits in response to a plurality of control signals. The configuration of the first and second circuits is generally dynamically updated.

21 Claims, 7 Drawing Sheets

DYNAMIC CONFIGURATION OF A TIME DIVISION MULTIPLEXING PORT AND ASSOCIATED DIRECT MEMORY ACCESS CONTROLLER

FIELD OF THE INVENTION

The present invention relates to voice signal transmission generally and, more particularly, to a dynamic configuration of a time division multiplexing port and associated direct memory access controller.

BACKGROUND OF THE INVENTION

Time Division Multiplexing (TDM) is a standard protocol used for voice traffic. A typical TDM controller has the capacity to handle hundreds or thousands of channels (or time slots) at a time. Sometimes several TDM ports share one TDM bus in a tri-state structure because one TDM port may not have enough bandwidth. However, at any given time, only a portion of the available time slots are active. Furthermore, previously active channels become inactive and new channels become dynamically active. It is mandatory that this change in configuration not affect any other channels being serviced at the time.

It would be beneficial to save internal bus bandwidth and memory space that is wasted on inactive channels. Further, it would be beneficial to be able to activate and/or deactivate certain time slots of TDM traffic without affecting the transmission or reception of other time slots in a timely manner.

There are several conventional approaches for dealing with TDM port configuration. One conventional approach is to read the data from each and every time slot of the TDM traffic into processor memory. With this approach, inactive channels are not masked. The processor has the responsibility to choose correct (i.e., active) time slots at any given time. However, internal bus bandwidth is wasted on useless data movement for inactive time slots. Another shortcoming with such an approach is that a large amount of processing power is used to extract useful data from the memory.

Another conventional approach is to read the data only for active time slots into processor memory. With this approach, slot masks are used to mask inactive channels. The processor has to update the slot masks after all of the data in the current frame is received or transmitted, but before the next frame starts. This approach is better as far as internal bandwidth utilization is concerned. However, in this scenario, the processor has to update the TDM configuration after the last active time slot of the current frame, but before the first time slot of next frame to ensure that other channels are not affected. This establishes a short timing window for the processor to respond to the change in configuration and process accordingly by setting correct slot masks. In other words, the performance of the TDM traffic controller is limited by the performance of the processor.

It would be desirable to implement a real time TDM port configuration method that (i) does not waste internal bus bandwidth on data movement for inactive time slots, (ii) does not need a large amount of processing power to extract useful data from the memory, and (iii) is not limited in performance by the performance of the processor.

SUMMARY OF THE INVENTION

The present invention concerns an apparatus comprising a transmit data path, a receive data path, a first circuit and a second circuit. The first circuit may be configured to transfer data between a first interface and the transmit and receive data paths. The second circuit may be configured (i) to transfer the data between the transmit and receive data paths and a second interface and (ii) to control a configuration update of the first and second circuits in response to a plurality of control signals. The configuration of the first and second circuits is generally dynamically updated.

The objects, features and advantages of the present invention include providing dynamic configuration of a time division multiplexing port and an associated direct memory access controller that may (i) be implemented without interrupting current operation of the TDM port, (ii) offer a level of performance that is independent from the performance of a DSP processor, (iii) be implemented without wasting DSP processing power or internal bus bandwidth in the configuration update, (iv) implement a shadow register to separate the working configuration from the new configuration, (v) implement tag bits associated with the data sample from active time slots to indicate the associated configuration, (vi) control the scheme or flow to select the timing and control the data synchronization of the configuration switch, (vii) reduce MIPS and bandwidth requirement on DSP processors, (viii) make the timing critical task of TDM configuration for DSP processors a non-critical task, (ix) be implemented without limiting the performance of the TDM controller by the performance of the DSP processor, and/or (x) have the potential to serve multiple processors with little modification.

BRIEF DESCRIPTION OF THE DRAWINGS

These and other objects, features and advantages of the present invention will be apparent from the following detailed description and the appended claims and drawings in which:

DETAILED DESCRIPTION OF THE DRAWINGS PREFERRED EMBODIMENTS

Figure 1:
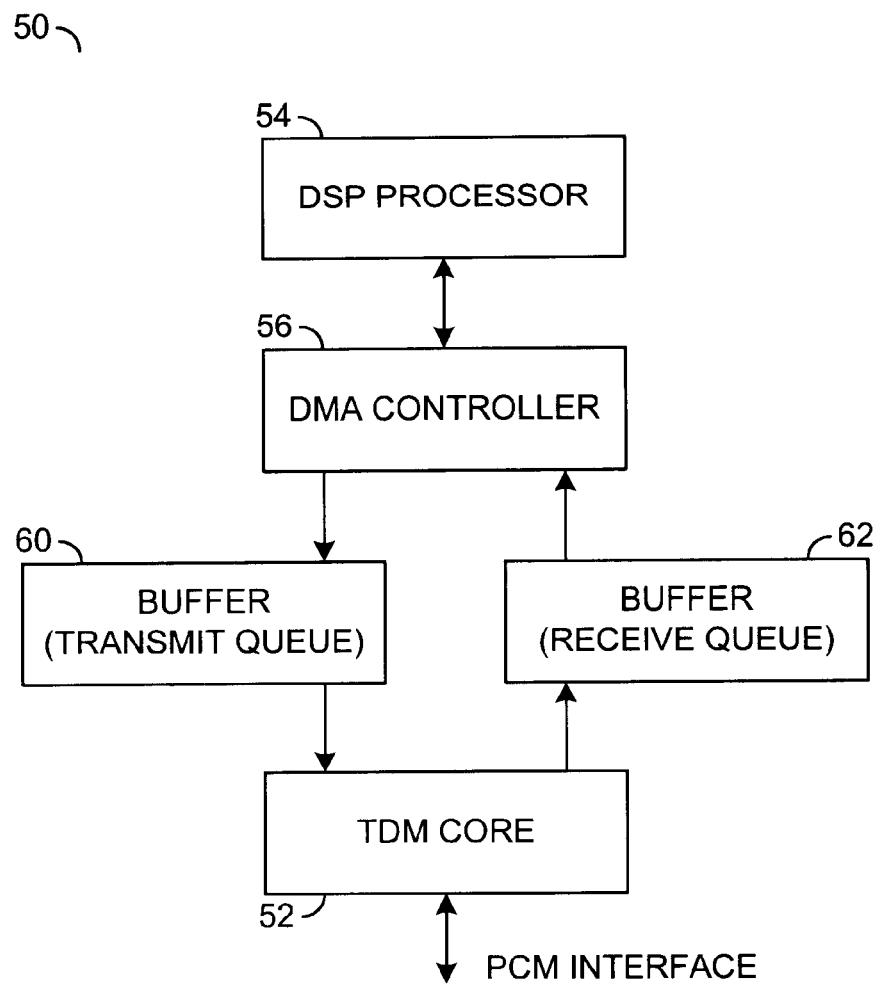
FIG. 1 is a block diagram illustrating a system with a TDM core and DSP with a DMA controller.

Referring to FIG. 1, a system 50 is shown. The system 50 may be implemented as a Time Division Multiplexing (TDM) port. The system 50 generally comprises a TDM Core 52, a Digital Signal Processor (DSP) 54 and a Direct Memory Access (DMA) controller 56. The circuit 50 is generally configured to receive and transmit data through an interface (e.g., a PCM interface). The DMA controller 56 is generally configured to adapt to the real time response of the DSP Processor 54. For example, an internal buffer (or queue) 60 and an internal buffer (or queue) 62 may couple the DMA controller 56 and the TDM core 52 in the transmit and the receive directions, respectively. The buffers 60 and 62 generally hold the sample data before the data is read by the core 52 or by the processor 54. The connection between the DMA controller 56 to the TDM core 52 through the transmit buffer 60 is generally referred to as a transmit data path (or transmit path). Similarly, the connection between the TDM core 52 and the DMA controller 56 through the receive buffer 62 is generally referred to as a receive data path (or receive path).

The rate at which the buffers 60 and 62 are read may differ from the rate at which the buffers 60 and 62 are filled. Only a small portion of available channels (e.g., time slots) of the TDM port 50 is generally active during most of the time. The status of the channels may change dynamically. For example, previously active channels may become inactive or previously inactive channels may become active. The system 50 may be configured to support dynamic configuration of the DMA controller 56 and the TDM core 52.

Figure 2:
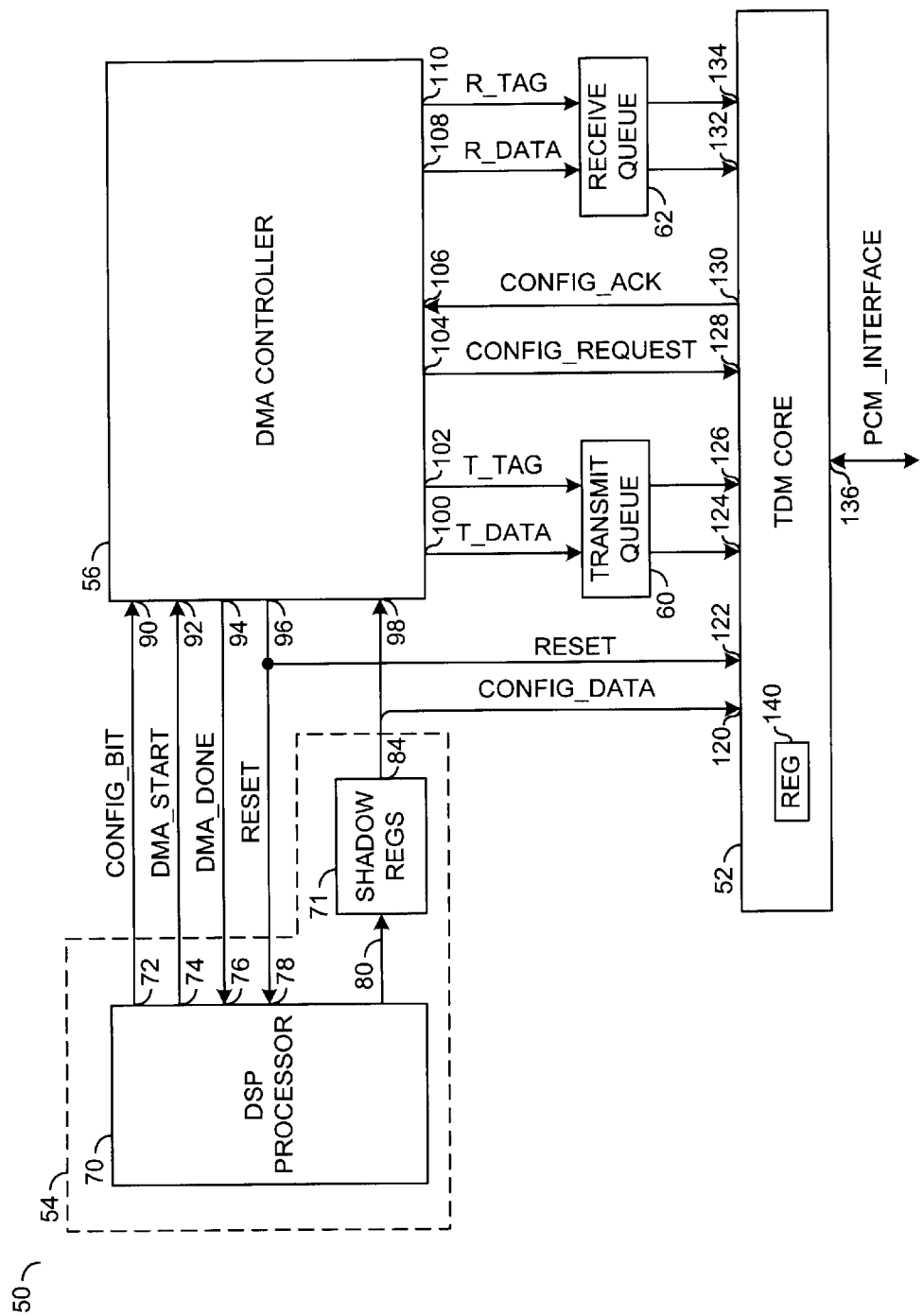
FIG. 2 is a more detailed diagram of the system of FIG. 1.

Referring to FIG. 2, a more detailed diagram of the system 50 is shown. The DSP processor 54 generally comprises a processor 70 and one or more shadow registers 71. The processor 70 may have an output 72, an output 74, an input 76, an input 78, and an output 80. The output 72 may present a signal (e.g., CONFIG_BIT). The output 74 may present a signal (e.g., DMA_START). The input 76 may receive a signal (e.g., DMA_DONE). The input 78 may receive a signal (e.g., RESET). The output 80 may connect the processor 70 to the shadow registers 71. The shadow registers 71 may have an output 84 that may present a signal (e.g., CONFIG_DATA). The signals CONFIG_BIT, DMA_START, DMA_DONE and RESET may be implemented as control signals. The signal CONFIG_DATA may comprise configuration data for dynamically updating the configuration of the DMA controller 56 and the TDM core 52. In one example, the signal CONFIG_BIT may be implemented to indicate a start of a configuration update for the DMA controller 56 and the TDM core 52. The signal CONFIG_BIT may be a multi-bit signal. For example, the signal CONFIG_BIT may have a first portion configured to control configuration update of a transmit portion of the system 50 and a second portion configured to control the configuration update of a receive portion of the system 50.

The DMA controller 56 may have an input 90 that may receive the signal CONFIG_BIT, an input 92 that may receive the signal DMA_START, an output 94 that may present the signal DMA_DONE, an output 96 that may present the signal RESET and an input 98 that may receive the signal CONFIG_DATA (or a portion of the signal CONFIG_DATA). The DMA controller 56 may also have an output 100 that may present a signal (e.g., T_DATA), an output 102 that may present a signal (e.g., T_TAG), an output 104 that may present a signal (e.g., CONFIG_REQUEST), an input 106 that may receive a signal (e.g., CONFIG_ACK), an input 108 that may receive a signal (e.g., R_DATA), and an input 110 that may receive a signal (e.g., R_TAG). The signals T_TAG and R_TAG may comprise tag bits associated with the sample data T_DATA and R_DATA, respectively. The signals CONFIG_REQUEST and CONFIG_ACK may be implemented as handshaking signals between the DMA controller 56 and the TDM core 52.

The TDM core 52 may have an input 120 that may receive the signal CONFIG_DATA (or a portion of the signal CONFIG_DATA), an input 122 that may receive the signal RESET, an input 124 that may receive the signal T_DATA (through the transmit queue 60), an input 126 that may receive the signal T_TAG (through the transmit queue 60), an input 128 that may receive the signal CONFIG_REQUEST, an output 130 that may present the signal CONFIG_ACK, an output 132 that may present the signal R_DATA (through the receive queue 62), an output 134 that may represent the signal R_TAG (through the receive queue 62) and an input/output 136 configured to couple the TDM core 52 to the PCM interface.

The TDM core 52 may comprise, in one example, a mask register 140 configured to mask inactive channels. The mask register 140 may be updated, in one example, during a frame-sync period when no voice data is present. A number of mask registers 140 may be implemented as needed to meet the design criteria of a particular implementation. When updating the parameters of the DMA controller 56, a control scheme of double buffering may be implemented. The parameters of the DMA controller 56 may be updated during the buffer switch period. Because of the possible rate discrepancies between the reading and writing of the queues 60 and 62, the timing to update the configuration of the TDM Core 52 and the DMA controller 56 is generally accurately coordinated. The coordination may be simplified by configuring the DMA controller 56 to control when to update the configuration in both the transmit and receive directions.

Dynamic configuration is generally achieved by (i) the processor 70 setting the signal CONFIG_BIT to indicate a configuration update is necessary, (ii) the processor 70 writing the new configuration information into the shadow registers 71, (iii) the DMA controller 56 controlling the tag bit signal T_TAG and monitoring the tag bit signal R_TAG associated with the sample data to determine when to update the configuration and/or (iv) handshaking between the DMA controller 56 and the TDM core 52 via the signals CONFIG_REQUEST and CONFIG_ACK.

The shadow registers 71 may comprise separate registers for the TDM core 52 and the DMA controller 56. For the TDM core 52, the shadow registers 71 may contain configuration information for updating a slot counter and slot masks in the transmit direction as well as the receive direction. For the DMA controller 56, the shadow registers 71 may contain configuration information for updating a sample size (e.g., the number of TDM frames) for DMA and a number of active channels (e.g., time slots) in both the transmit and receive directions.

In the transmit direction, the DMA controller 56 is generally configured to update the configuration after a direct memory access is completed (e.g., the signal DMA_DONE is asserted) and before the next direct memory access starts (e.g., assertion of the signal DMA_START). The DMA controller 56 may indicate the adoption of a new configuration by toggling the tag bit signal T_TAG associated with the sample data signal T_DATA presented to the transmit queue 60 for the new DMA that starts immediately following the change in configuration. The DMA controller 56 generally does not update the configuration again until the configuration of the TDM core 52 has been updated. When the TDM core 52 reads sample data T_DATA from the queue 60, the TDM core 52 may be configured to sense the toggling of the signal T_TAG and update its configuration. The DMA controller 56 may receive acknowledgment of the configuration change via the signal CONFIG_ACK. The DMA controller 56 may again change configuration, if necessary, when the DMA operation is completed.

Figure 3:
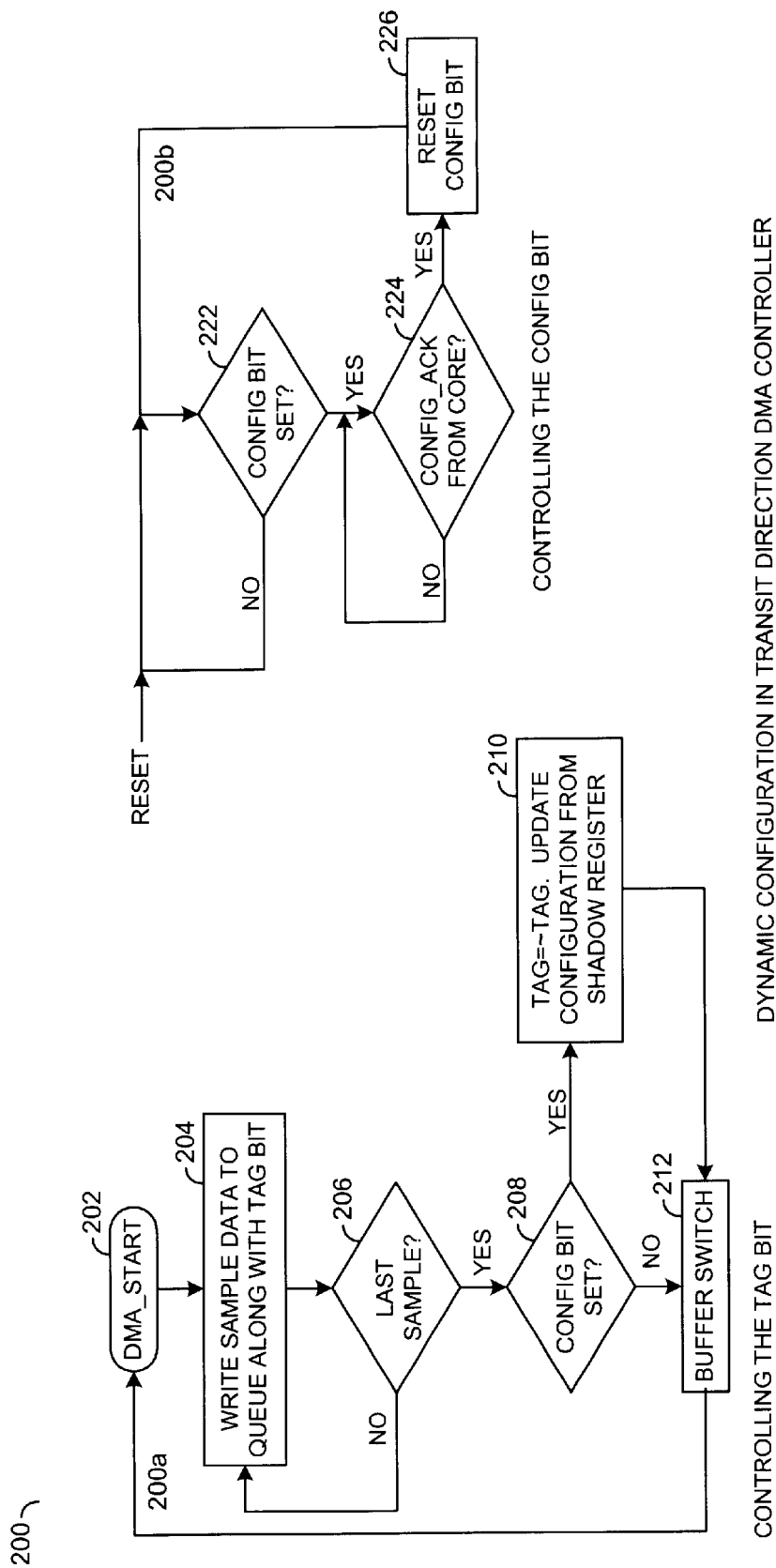
FIG. 3 is a flow diagram illustrating flow control of a tag bit and configuration bit used for the dynamic configuration of the DMA controller in the transmit direction.

Referring to FIG. 3, a flow diagram of a process (or method) 200 is shown illustrating an example flow control via a tag bit and a configuration bit of the dynamic configuration of the DMA controller 56 in the transmit direction (e.g., through the transmit data path). The process 200 generally comprises two control loops (e.g., 200A and 200B) that may run concurrently. The loop 200A generally controls the signal T_TAG (e.g., the tag bit). The loop 200B generally controls the signal CONFIG_BIT (e.g., the configuration control bit). The loop 200A generally comprises a state 202, a state 204, a decision state 206, a decision state 208, a state 210, and a state 212. The state 202 implements the signal DMA_START. The state 204 writes sample data to the queue 60 along with a tag bit via the signal T_TAG. The decision state 206 determines if the sample data is the last sample. If the data is not the last sample, the process 200A moves back to the state 204. If the data is the last sample, the process 200A moves to the state 208.

The decision state 208 determines if the signal CONFIG_BIT is set. If the signal CONFIG_BIT has not been set, the process 200A moves to the state 212, which provides a buffer switch. If the signal CONFIG_BIT has been set, the process 200A moves to the state 210. The state 210 updates the configuration of the DMA controller 56 from the shadow registers 71 and toggles the tag bit presented by the signal T_TAG. The process 200A then moves to the state 212. The state 212 moves back to the state 202.

The process 200B generally comprises a decision state 222, a decision state 224, and a state 226. Following a reset (e.g., assertion of the signal RESET) the process 200B monitors the signal CONFIG_BIT. If the signal CONFIG_BIT is not asserted (e.g., not set), the process 200B remains in the decision state 222. Once the decision state 222 determines that the signal CONFIG_BIT is asserted (e.g., set), the process moves to the decision state 224. The decision state 224 determines if the signal CONFIG_ACK from the TDM core 52 has been received. If the signal CONFIG_ACK has not been received, the process 200B stays in the state 224. If the signal CONFIG_ACK from the TDM core 52 has not been received, the process 200B moves to the state 226. In the state 226, the signal CONFIG_BIT is reset (or cleared). For example, the signal RESET may be asserted.

Figure 4:
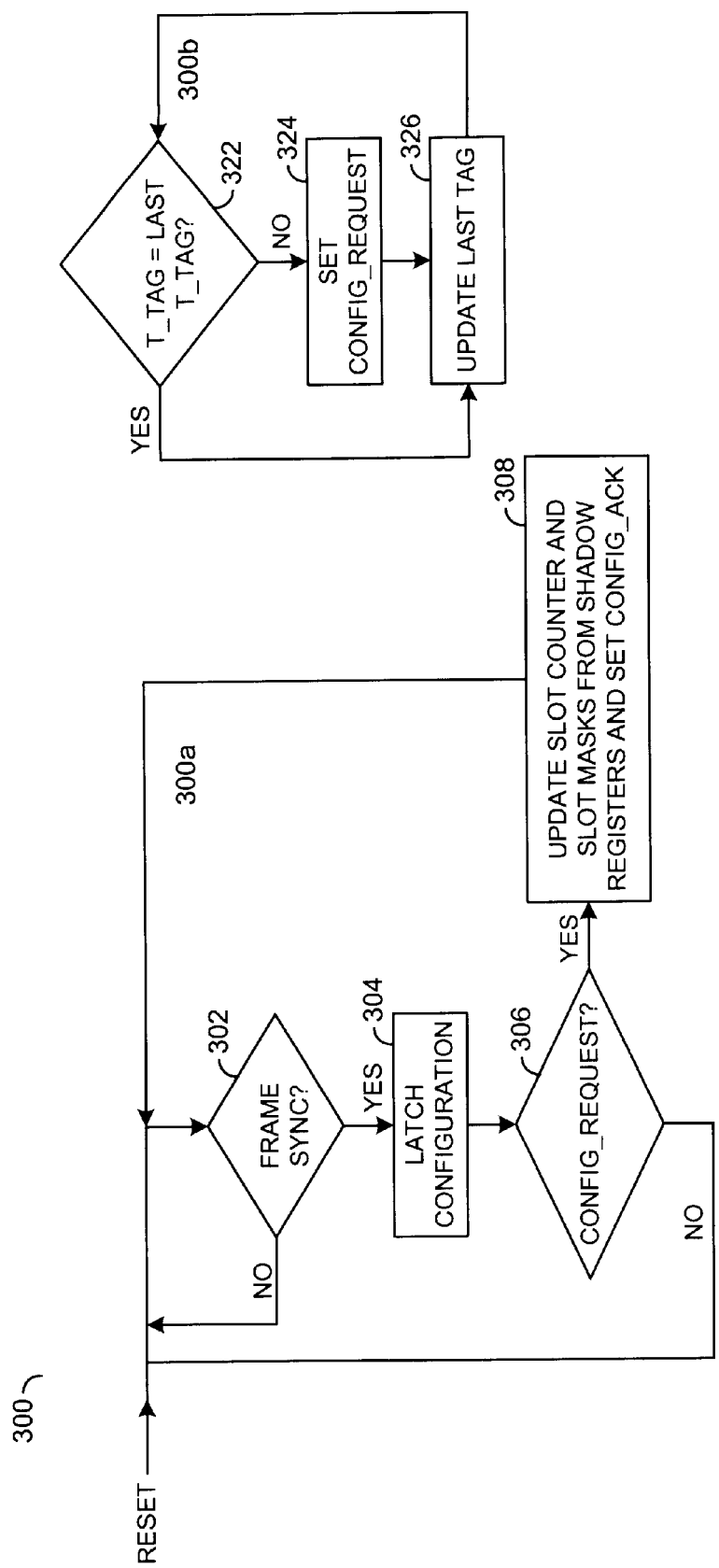
FIG. 4 is a flow diagram illustrating a process of using a tag bit and control of a configuration acknowledge for dynamic configuration of a TDM core in the transmit direction.

Referring to FIG. 4, a flow diagram of a process (or method) 300 is shown illustrating the use of a tag bit and control of the signal CONFIG_ACK for dynamic configuration of the TDM core 52 in the transmit direction (e.g., through the transmit data path). The process 300 generally comprises a process 300A and a process 300B that may be running concurrently. The process 300A generally comprises a decision state 302, a state 304, a decision state 306 and a state 308. Following a reset, the process 300A generally enters the decision state 302. The decision state 302 determines if a frame synchronization has occurred. If a frame synchronization has not occurred, the process 300A remains in the decision state 302. If a frame synchronization has occurred, the process 300A generally moves to the state 304. While in the state 304, the TDM core 52 generally latches the current configuration (e.g., the current slot counter) and moves to the decision state 306. The decision state 306 determines if the signal CONFIG_REQUEST is asserted. If the signal CONFIG_REQUEST is not asserted, the process 300A moves back to the decision state 302.

If the signal CONFIG_REQUEST is asserted, the process 300A moves to the state 308. The state 308 updates the configuration information of the TDM core 52 (e.g., the slot counter and slot masks) from the shadow registers 71 and asserts (e.g., sets) the signal CONFIG_ACK.

The process 300B generally comprises a decision state 322, a state 324 and a state 326. The decision state 322 checks to see if the tag bit (e.g., the signal T_TAG) associated with the sample data is equal to the previous tag bit (e.g., stored as a signal LAST_T_TAG). If the signal T_TAG is not equal to the signal LAST_T_TAG, the subroutine 300b moves to the state 324, which asserts the signal CONFIG_REQUEST. After asserting the signal CONFIG_REQUEST, the process 300B moves to the state 326 which updates the signal LAST_T_TAG and then moves back to the decision state 322. When the decision state 322 determines that the current signal T_TAG is equal to the signal LAST_T_TAG, the process 300B moves directly to the state 326.

In the receive direction (e.g., the receive data path), the DMA controller 56 is generally configured to follow the TDM core 52 in updating its configuration information. The DMA controller 56 may send the signal CONFIG_REQUEST to change the configuration of the TDM core 52. The signal CONFIG_REQUEST may be sent one frame prior to the last frame in the DMA transfer. That is, for example, if DMA sample size is 5 frames and each frame has 3 active channels, the configuration request may be sent to the core after the 4th frame sync. The TDM core 52 generally uses the old configuration at the 5th frame sync, and simultaneously updates the register 140 to the new configuration for the next frame. The register 140 is one of a number of registers that may be present in the TDM core 52. Acknowledgment is generally sent to DMA controller 56 via the signal CONFIG_ACK and the tag bit may be toggled. The DMA controller 56 may check the tag bit only after DMA_DONE and for the first sample of a new DMA. When the DMA controller 56 finds the tag bit different than for the previous DMA, the DMA controller 56 updates its configuration. Between the time a request is sent to the TDM core 52 and the time when the DMA controller 56 actually updates its configuration, the values in the shadow registers 71 is not generally changed.

Figure 5:
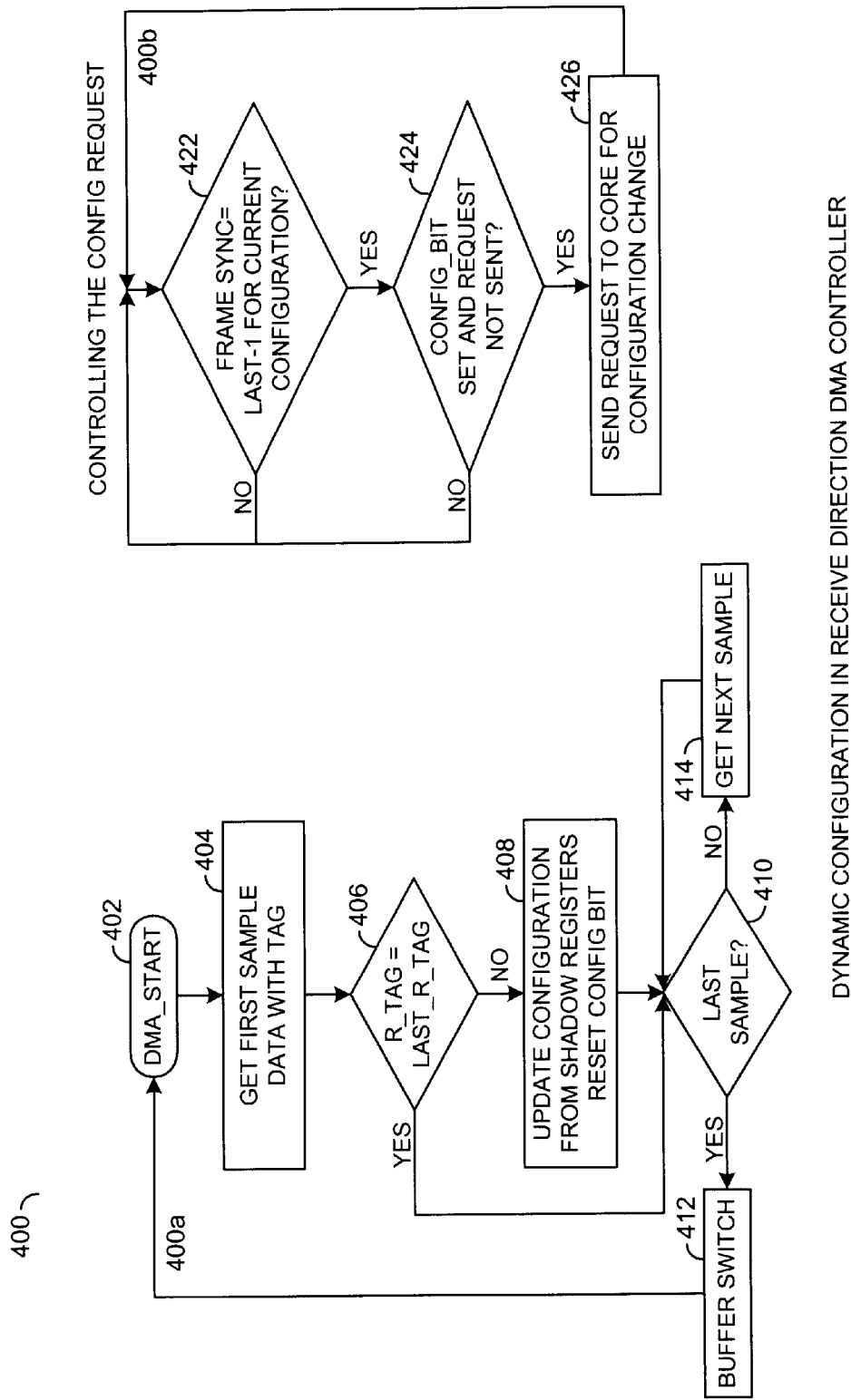
FIG. 5 is a flow diagram illustrating flow control of the configuration bit and configuration request and use of a tag bit for dynamic configuration of a DMA controller in the receive direction.

Referring to FIG. 5, a process (or method) 400 is shown illustrating flow control of the configuration bit and the signal CONFIG_REQUEST and use of the tag bit signal R_TAG for dynamic configuration of the DMA controller 56 in the receive direction (e.g., the receive data path). The process 400 generally comprises a process 400A and a process 400B that may run concurrently. The process 400A generally comprises a state 402, a state 404, a decision state 406, a state 408, a decision state 410, a state 412 and a state 414. Upon receiving a DMA start signal (e.g., the signal DMA_START) the process 400A moves from the state 402 to the state 404. The state 404 gets a first sample of data (e.g., R_DATA) with a tag bit (e.g., R_TAG) and moves to the state 406. The decision state 406 determines if the bit R_TAG is equal to the previous tag bit (e.g., a signal LAST_R_TAG). If so, the method 400A moves to the decision state 410. If not, the method 400A moves to the state 408. The state 408 updates the configuration of the DMA controller 56 from the shadow registers 71, resets the configuration bit and moves to the state 410. The decision state 410 determines if the sample data is the last sample. If so, the method 400A moves to the state 412. If not, the method 400A moves to the state 414. The state 414 acquires the next sample and moves back to the decision state 412. The state 410 implements a buffer switch and returns to the start state 402.

The method 400B generally comprises a decision state 422, a decision state 424 and a state 426. The decision state 422 determines if a current frame synchronization belongs to the next to last frame for the current configuration. If not, the process 400B stays in the decision state 422. If so, the process 400B moves to the decision state 424. The decision state 424 determines if the configuration bit is set (e.g., the signal CONFIG_BIT is asserted) and if a request has not been sent to the TDM core 52. If the configuration bit is not set or a request has been sent to the TDM core 52, the process 400B returns to the decision state 422. If the configuration bit is set and the request has not been sent, the process 400B moves to the state 426. The state 426 sends a request for the TDM core 52 to update configuration and moves back to the decision state 422.

Figure 6:
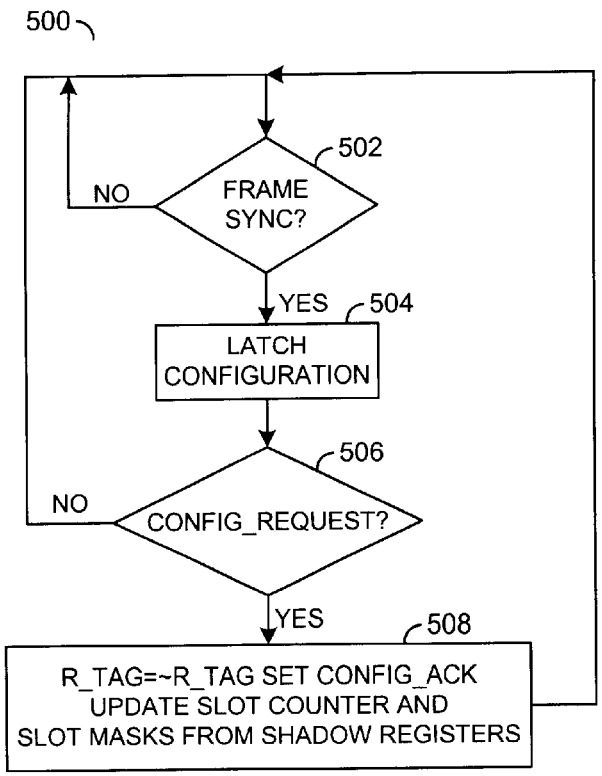
FIG. 6 is a flow diagram illustrating, using a configuration request and control of a tag bit and configuration acknowledge for dynamic configuration of a TDM core in the receive direction.

Referring to FIG. 6, a flow diagram of a process (or method) 500 is shown illustrating a method for dynamic configuration of the TDM core 52 in the receive direction (e.g., the receive data path). The method 500 generally comprises a decision state 502, a state 504, a decision state 506 and a state 508. The state 502 generally determines if a frame synchronization has occurred. If not, the method 500 remains in the state 502. If so, the method 502 moves to the state 504. The state 504 latches the receive configuration of the TDM core 52 and moves to the decision state 506. The decision state 506 determines if a configuration request (e.g., the signal CONFIG_REQUEST) has been received. If not, the method 500 returns to the decision state 502. If a configuration request has been received, the method 500 moves to the state 508. The state 508 updates the receive configuration information of the TDM core 52 (e.g., the slot counter and slot masks) from the shadow registers 71, toggles the value of the tag bit (e.g., the signal R_TAG), asserts (e.g., sets) the signal CONFIG_ACK and returns to the state 502.

Figure 7:
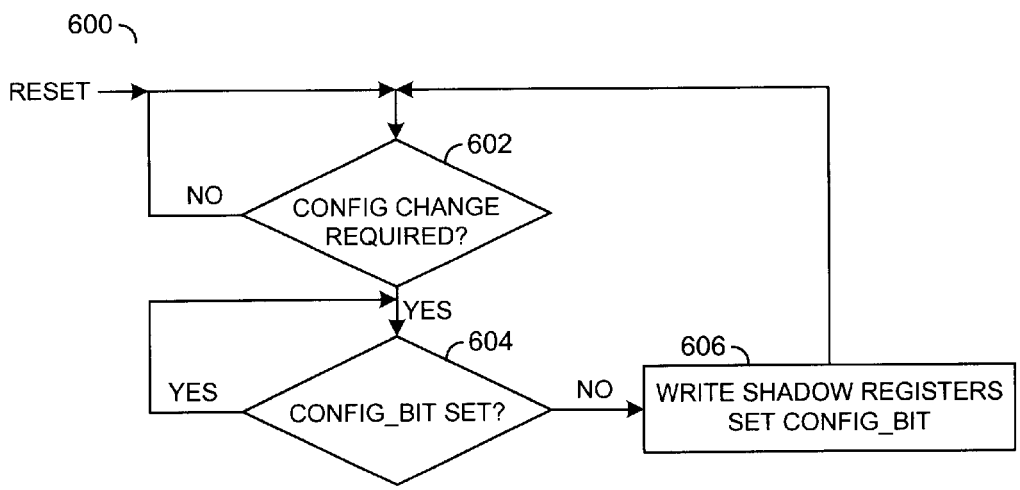
FIG. 7 is a flow diagram illustrating the process of writing the shadow registers used for dynamic configuration.

Referring to FIG. 7, a flow diagram of a process (or method) 600 shown illustrating a process for writing to the shadow registers 71 used for dynamic configuration. The process 600 generally comprises a decision state 602, a decision state 604 and a state 606. Following a reset, the decision state 602 determines if a configuration change is needed. If not, the method 600 remains in the state 602. If so, the method 600 moves to the state 604, which determines if a configuration bit has been set.

Next, the process 600 determines if the configuration bit CONFIG_BIT has been set. If so, the method remains in the decision state 604. If not, the method moves to the state 606 which writes configuration update information to the shadow registers 71 and sets the configuration bit (e.g., asserts the signal CONFIG_BIT). The method 600 then returns to the decision state 602.

Figure 8:
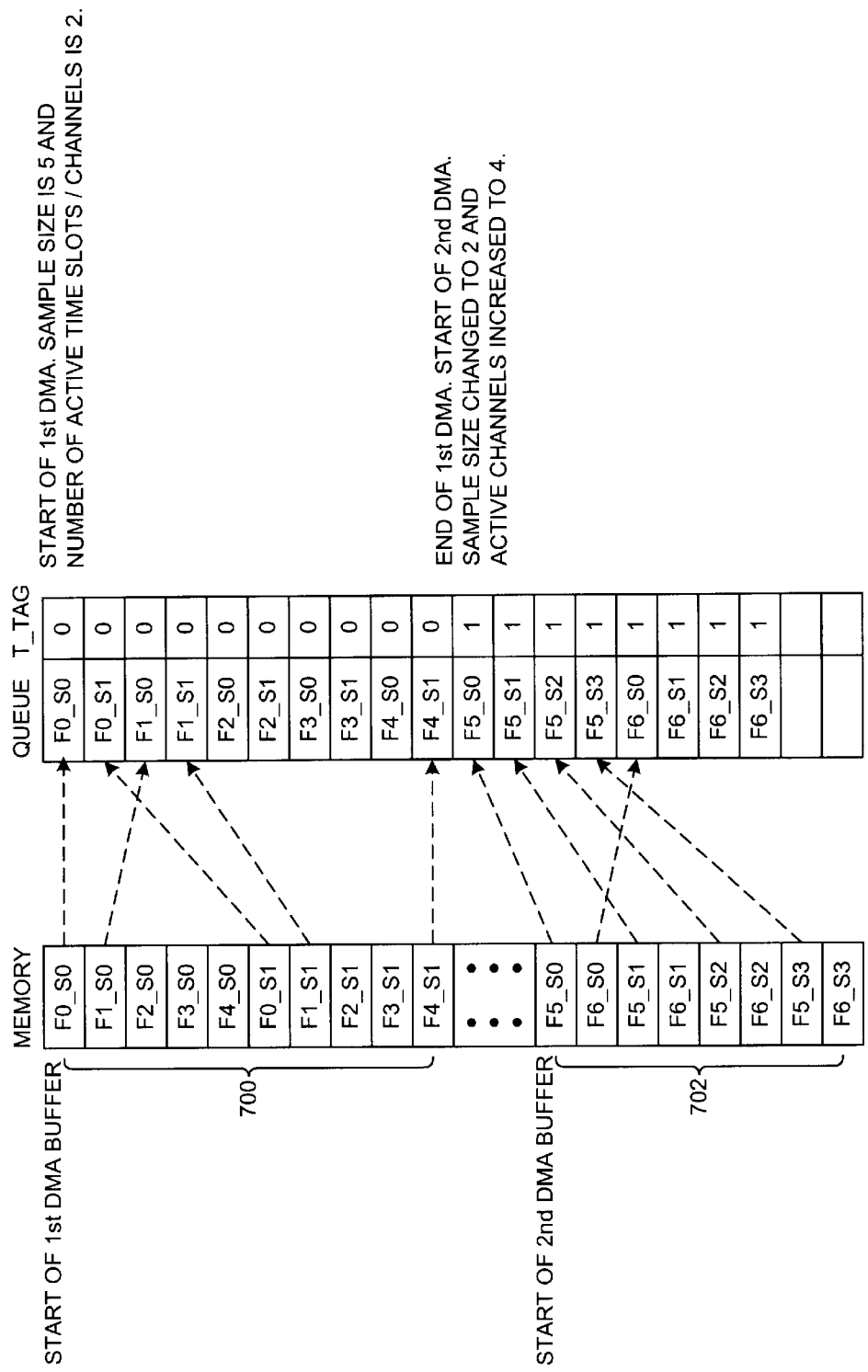
FIG. 8 is a diagram illustrating an example transfer between memory and a queue as affected by dynamic configuration.

Referring to FIG. 8, a block diagram is shown illustrating an example DMA transfer from memory to the transmit queue 60 as affected by dynamic configuration. In one example, the system 50 may have a configuration with a sample size of 5 and a number of active time slots per channel of 2. The contents of a memory buffer 700 may be distributed among a number of frames. For example, the memory buffer 700 may contain 2 samples for each of the 5 channels. The samples may be designated F0 to F4 and the time slots may be designated as S0 and S1. The data from the DMA controller 56 may be transferred to the transmit queue 60 such that all of the samples from a first time slot are sent, then all of the samples from the next time slot are sent. The tag bit T_TAG may be set to 0. Following transfer of the buffer 700, a reconfiguration of the system 50 may occur. A new configuration may specify a sample size of 2 and an active number of channels as 4. The data from the buffer 702 in a memory of the system 50 may be transferred to the transmit queue 60. The tag bit T_TAG may have the value toggled to 1 to indicate the change in configuration.

The function performed by the flow diagrams of FIGS. 3–7 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMS, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a transmit data path;
   a receive data path;
   a first circuit configured to transfer data between a first interface and said transmit and receive data paths; and
   a second circuit configured (i) to transfer said data between said transmit and receive data paths and a second interface and (ii) to control a configuration update of said first and second circuits in response to a plurality of control signals, wherein said configuration of said first and second circuits is dynamically updated.

2. The apparatus according to claim 1, wherein said first circuit comprises a time division multiplexing (TDM) core.

3. The apparatus according to claim 1, wherein said second circuit comprises a direct memory access (DMA) controller.

4. The apparatus according to claim 1, wherein said transmit and receive data paths each comprise (i) a buffer configured to store data and (ii) a tag bit associated with said data.

5. The apparatus according to claim 4, wherein said buffers comprises a first-in first-out (FIFO) memory.

6. The apparatus according to claim 1, wherein said first interface is coupled to a time division multiplexed transmission medium by a pulse code modulation (PCM) interface.

7. The apparatus according to claim 1, wherein said second interface is configured to couple said second circuit to a processor bus.

8. The apparatus according to claim 1, wherein said first and second circuits are configured to update configuration information in response to one or more handshaking signals.

9. The apparatus according to claim 8, wherein said handshaking signals comprise a request signal, an acknowledge signal and one or more tag bits.

10. The apparatus according to claim 1, further comprising:
   a processor configured to (i) generate one or more of said plurality of control signals and (ii) present configuration update information for updating said configuration of said first and second circuits.

11. The apparatus according to claim 10, wherein said processor comprises one or more registers configured to store said configuration update information.

12. The apparatus according to claim 8, wherein:

said first circuit is configured (i) to perform said configuration update in response to a first handshaking signal and (ii) to generate a second handshaking signal; and said second circuit is configured (i) to generate said first handshaking signal and (ii) to perform said configuration update in response to said second handshaking signal.

13. The apparatus according to claim 1, wherein said second circuit is configured to control said configuration update in response to a tag bit associated with said data.

14. The apparatus according to claim 13, wherein said first circuit and said second circuit are configured to change a state of said tag bit in response to a configuration update request.

15. An apparatus comprising:

means for communicating transmit data;

means for communicating receive data;

means for transferring data between a first interface and said transmit data communicating means and said receive data communicating means; and means for (i) transferring said data between said transmit data communicating means and said receive data communicating means and a second interface and (ii) controlling a configuration update of said transmit data communicating means and said receive data communicating means in response to a plurality of control signals, wherein said configuration of said transmit data communicating means and said receive data communicating means is dynamically updated.

16. A method for dynamically configuring a time division multiplexing port and associated direct memory access controller comprising the steps of:

providing a transmit data path;

providing a receive data path;

transferring data between a first interface and said transmit data path and said receive data path; and transferring said data between said transmit data path and said receive data path and a second interface; and controlling a configuration update of said transmit data path and said receive data path in response to a plurality of control signals, wherein said configuration of said transmit data path and said receive data path is dynamically updated.

17. The method according to claim 16, further comprising the step of:

changing one or more of (i) a number of active slots, (ii) a number of active channels, (iii) a slot counter and (iv) a slot mask during said configuration update.

18. The method according to claim 16, wherein the step of controlling said configuration update comprises the steps of:

receiving a first data sample and tag bit;

comparing a current value of said tag bit to a previous value of said tag bit; and updating said configuration of said transmit data path and said receive data path when said current value is different from said previous value.

19. The method according to claim 16, wherein the step of controlling said configuration update comprises the steps of:

writing a last data sample and tag bit to said transmit data path;

changing a current value of said tag bit in response to a request to update said configuration; and retrieving configuration update information from a shadow register.

20. The method according to claim 16, further comprising the steps of:

generating a control signal configured to start said configuration update of one or both of said transmit data path and said receive data path; and providing configuration update information for said configuration update of said transmit data path and said receive data path.

21. An apparatus comprising:

a transmit data path configured to store data and a first tag bit associated with said data;

a receive data path configured to store data and a second tag bit associated with said data;

a first circuit configured (i) to transfer said data between a first interface and said transmit and receive data paths and (ii) to control a state of a first handshaking signal and said second tag bit; and a second circuit configured (i) to transfer said data between said transmit and receive data paths and a second interface, (ii) to control a state of a second handshaking signal and said first tag bit and (iii) to control a configuration update of said first and second circuits in response to said first and second handshaking signals and said first and second tag bits, wherein said configuration of said first and second circuits is dynamically updated.

* * * * *